United States Patent [19]
Toussaint

[11] 4,306,682
[45] Dec. 22, 1981

[54] MACHINE FOR AGRICULTURAL IRRIGATION

[75] Inventor: Jean Y. Toussaint, Redon, France

[73] Assignee: Wright Rain Limited, Hampshire, England

[21] Appl. No.: 83,285

[22] Filed: Oct. 10, 1979

[30] Foreign Application Priority Data

Oct. 13, 1978 [FR] France ............................. 78 29348

[51] Int. Cl.³ .............................................. B05B 3/18
[52] U.S. Cl. ............................ 239/199; 137/355.27; 242/117; 242/86.2; 242/86.5 R
[58] Field of Search ........ 239/191, 192, 195, 197–199; 137/344, 355.12, 355.16, 355.2, 355.21, 355.26, 355.27; 242/117, 86, 86.2–86.4, 86.5 R, 86.7

[56] References Cited

U.S. PATENT DOCUMENTS

| 160,220 | 2/1875 | Muller | 239/199 |
|---|---|---|---|
| 2,039,250 | 4/1936 | Junge | 137/355.26 |
| 2,679,987 | 6/1954 | Saliba | 242/66 |
| 4,174,809 | 11/1979 | Arlemark | 239/197 X |

FOREIGN PATENT DOCUMENTS

1266215 3/1972 United Kingdom ............... 242/86.3

Primary Examiner—Robert W. Saifer
Attorney, Agent, or Firm—Gifford, VanOphem, Sheridan & Sprinkle

[57] ABSTRACT

An agricultural irrigation machine of the hose-drum type in which a hose through which water is passed leads from a drum on which the hose is wound to an irrigation trolley or sledge carrying a nozzle or water-gun. The hose-drum is mounted to rotate about a horizontal axis on a turret which can be turned about a vertical axis, whereby the hose-drum can be oriented in the direction of the unwound part of the hose. The hose-drum is driven in the hose-rewinding sense while water is flowing through the hose to the irrigation trolley or sledge. The hose-drum rests in a cradle of rollers and is driven in the hose-rewinding sense by a sprocket wheel engaging a captive chain wrapped around a peripheral channel on a flange of the drum.

25 Claims, 11 Drawing Figures

MACHINE FOR AGRICULTURAL IRRIGATION

BACKGROUND OF THE INVENTION

I. Field of the Invention

The invention relates to a machine for agricultural irrigation and is particularly concerned with an irrigation machine of the hose-drum type.

II. Description of the Prior Art

In previously known irrigation machines of the hose type, a hose-drum is mounted on a chassis or supporting vehicle, the hose-drum has a flexible hose wound thereon and supplied at the inner end of the hose from a source of water, the outer end of the hose being attached to an irrigation nozzle or gun mounted on a trolley or sledge. By winding-in the hose on the drum while water is being supplied through the hose, the irrigation nozzle or gun discharges water while the trolley or sledge with the nozzle or gun thereon is pulled by the hose towards the chassis or supporting vehicle on which the drum is mounted.

In conventional hose-drum machines of the foregoing type it is conventional to mount the drum for rotation about a central horizontal shaft supported at its end on brackets or stanchions, which are either mounted directly on the chassis or supporting vehicle, or are mounted on a turret or platform supported on the chassis or vehicle for turning about a vertical axis. Such machines have a number of disadvantages.

The first disadvantage is that as the drum is of large diameter and axial length in order to accommodate a long length of hose, the drum and hose, particularly when the latter is running full of water, are extremely heavy. Therefore the supporting brackets and turret, where the drum is mounted on a turret, are of heavy construction and extend above the chassis. The combined centre of gravity of the hose-drum and supporting structure is therefore at a substantial height above the chassis. There is therefore a risk that the machine could topple over, particularly where it is being transported over rough ground. In addition, this risk of toppling over is present during operation, that is during watering, since the tension of the hose is pulling the trolley or sledge is applied at the height of the shaft of the drum. This tensile force is considerable, taking into account the length and diameter of the hose, the weight of the water therein and the frictional forces between the hose and the ground. Therefore the moment of this tensile force applied by the hose to the drum at the height of the axis of the shaft also tends to topple the chassis.

Another disadvantage of known hose-drum machines is that the hose, although it is wound-up from the bottom of the drum, still has to be raised during winding due to the drum being mounted above the chassis, particularly where the drum is mounted on a turret. This also results in a tendency for the machine to be unstable.

Yet another disadvantage is that the drum and its supporting shaft are usually formed as an assembly which cannot readily be removed from the chassis or turret, for example, to facilitate transport of the machine.

The invention has as its object the avoidance of these and other disadvantages.

SUMMARY OF THE PRESENT INVENTION

According to the invention, a hose-drum irrigation machine of the kind carrying a hose-drum mounted for rotation about a horizontal axis and mounted either directly on a chassis or supporting vehicle or on a turret or platform rotatable about a vertical axis with respect to the chassis or supporting vehicle, includes two sets of drum-supporting rollers or wheels mounted for rotation on the turret or platform or chassis or supporting vehicle to provide a cradle on which the drum is mounted and is rotatable about the longitudinal axis of the drum without the provision of a central supporting shaft co-axial with the drum. The drum includes a pair of laterally-spaced peripheral rolling tracks arranged to engage the supporting rollers or wheels. Two sets of drum-locating wheels are mounted for rotation about axes spaced from the axes of rotation of the drum-supporting rollers or wheels to engage radially inner surfaces of the peripheral rolling tracks to maintain the drum in engagement with the drum-supporting rollers or wheels and to restrain the drum from end-wise movement on the drum-supporting rollers or wheels. At least one of the drum-supporting rollers or wheels is arranged to be driven to effect rotation of the drum in the hose re-winding sense.

The drum-supporting rollers or wheels may be arranged very close to the turret or chassis or supporting vehicle on which they are mounted. Consequently, the axis of rotation of the drum and the height of the center of gravity of the drum, and hence of the combined drum and chassis, and turret where provided, are situated much lower than in conventional hose-drum machines as the central shaft of the drum and it supporting brackets or stanchions have been eliminated. In addition, the supporting rollers or wheels can be made of relatively small diameter and be so positioned with respect to the chassis that the hose can be wound onto the drum substantially tangentially, thereby making it unnecessary for the hose to be lifted through a substantial height from the ground during rolling-up of the hose. As a result, the stability of the machine according to the present invention is greatly improved and consequently the risk of toppling is substantially eliminated.

At least one drum-supporting wheel may be associated with a toothed sprocket wheel engaging a chain enveloping or co-axial with one of the peripheral rolling tracks on the drum and fixed with respect to the drum, the sprocket wheel being connected to be driven by a turbine or hydraulic piston motor arranged to be driven by water supplied to the hose. By using a driving chain fixed around the drum and engaged by the sprocket wheel, a positive driving movement is applied to the drum while water is flowing through the hose to the irrigation nozzle or gun. The teeth of the sprocket wheel engaging in the chain tend to limit the drum from moving in the axial direction. Additionally a sideways locating wheel or wheels may be provided in engagement with the drum.

Preferably, the peripheral rolling track adjacent the sprocket wheel may be formed with a peripheral channel open radially outwardly of the drum containing a ring of rubber or other elastomeric material in which the chain is embedded, whereby the chain will be fixed with respect to the drum. By embedding the chain in rubber or other elastomeric material, the adhesion of the chain to the drum is ensured and furthermore, it is not necessary to use a chain of precise axial length. The rubber or other elastomeric material enables any increase in length of the chain during use to be accommodated. The peripheral rolling track on the drum adjacent the channel in which the chain is located, is preferably engaged by a drum-supporting roller or wheel mounted adjacent the sprocket, a similar supporting wheel or roller being provided to engage the same peripheral rolling track at a fixed peripheral distance from the first-mentioned supporting wheel or roller. Each said supporting wheel or roller may be mounted on a supporting plinth which also carries a second wheel or roller engaging a radially-inner surface on the peripheral rolling track. The said second wheel or roller may also be inclined to engage a side wall of the peripheral rolling track, thereby to locate the drum to restrain axial movement of the latter. Preferably the drum is provided with a pair of axially-spaced peripheral rolling tracks each supported by a pair of circumferentially-spaced wheels or rollers and also located by associated said second wheel or roller, whereby the drum is supported and located at four positions, in addition preferably at least one of said wheels or rollers is associated with a driving sprocket, as aforesaid.

Another important feature which may be provided is to construct the drum in a plurality of arcuate portions which are assembled circumferentially and may be dismounted and re-assembled to facilitate transport of the machine.

As aforesaid, the machine may include a turret rotatable about an upright axis and in that case the drum-supporting rollers and wheels and associated rollers or wheels are mounted on the turret, which in turn is mounted on the chassis.

The chassis may have a main portion supporting the turret and/or the hose-drum and this portion may be supported by ground-engaging wheels and/or legs and may be provided with a draw-bar. The draw-bar, ground-engaging wheels and legs may be mounted on detachable frame portions which are removable from the main portion and are interchangeable depending on whether the chassis is to be free-standing, wheeled or to be towed by a tractor or the like.

BRIEF DESCRIPTION OF THE DRAWING

By way of example, two main embodiments of irrigation machine in accordance with the invention and modifications of these embodiments are now described by way of example, with reference to the accompanying drawings, in which.

DETAILED DESCRIPTION OF THE PREFERRED EMBODIMENTS OF THE PRESENT INVENTION

The first embodiment of irrigation machine according to the invention illustrated in FIGS. 1-6 includes a very low chassis 8 formed by two longitudinal members joined at one end, by a cross-member 81 supporting axles for two wheels 82, 83, and, at the other end, by a tow-bar 84 for towing the machine by means of a tractor. A retractable leg 85 is provided on the tow-bar 84 for support on the ground (see FIGS. 1 and 2).

Figure 1:
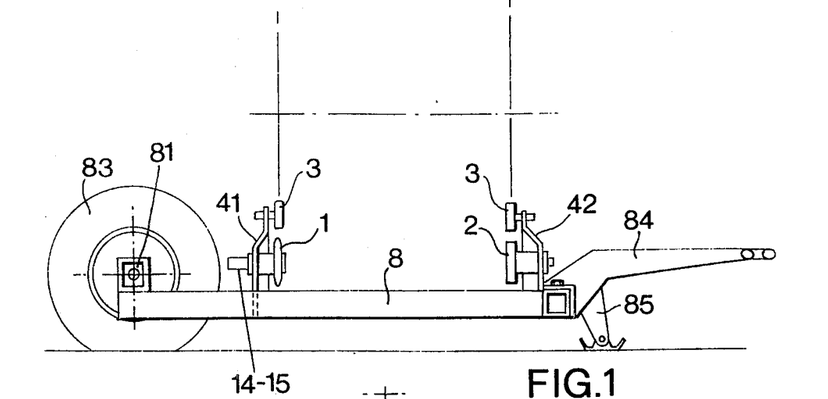
FIG. 1 is a side view of the chassis of the first embodiment showing drum-supporting and driving wheels and drum-locating rollers, the drum being omitted.
Figure 2:
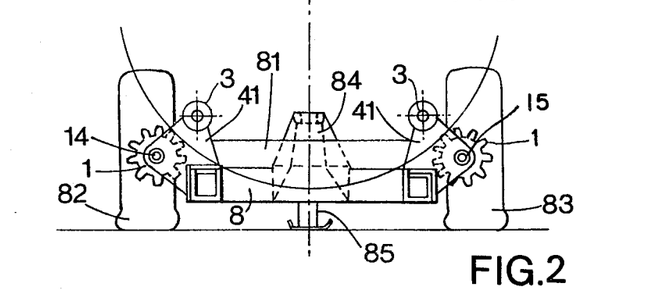
FIG. 2 is a rear view of the chassis shown in FIG. 1.

Two pairs of brackets 41 and 42 are fixed on the chassis 8 and on these are mounted, respectively, a toothed sprocket wheel 1 and a hose-drum locating roller 3 on each bracket 41 and a smooth wheel 2 and a hose-drum locating roller 3 on each bracket 42. The two toothed sprocket wheels 1, with their associated rollers 3, and the smooth wheels 2, with their associated rollers 3, are arranged, respectively substantially in two planes perpendicular to the chassis and spaced apart longitudinally thereof, as shown in FIG. 1. The two sprocket wheels 1 and the two smooth wheels 2 support the hose-drum 56 (FIG. 3) for rotation about an axis parallel to the axis of the sprocket wheels 1 and the smooth wheels 2, as described hereinafter.

The drum 56 for rolling-up the hose 7, is formed by two semi-cylindrical drum portions 5 and 6.

The hose-drum 56 includes two lateral peripheral rolling tracks 51 and 52 in the form of substantially U-profiled peripheral channels open radially-outwardly of the drum (see FIGS. 4 and 5), and fixed, for example by welding, to two side members in the form of rings 53 and 54. A chain 60, having links 61, is mounted in the rolling track 51 of the drum to act in conjunction with the toothed sprocket wheels 1.

The drum 56 is supported with its lower part of its periphery on toothed sprocket wheels 1 applied against its rolling track 51 and on smooth wheels 2 applied against its rolling track 52 and with its axis of rotation 57 (FIG. 3) parallel to the axes of rotation of the sprocket wheels 1 and the smooth wheels 2. Since these supporting wheels 1 and 2 are mounted close to the chassis 8, the center of gravity of the drum and the chassis is located as low as is possible. In addition, while the drum 56 is rotating (as discussed hereinafter) it turns within a space practically tangential to the chassis 8. By virtue of the invention, the stability of the machine is thus excellent and the risk of the machine overturning is practically eliminated.

The locating rollers 3 are freely rotatable on the brackets 41 and 42, and are arranged nearer to the axis 57 of the drum 56 on the radially inner surfaces of the rolling tracks 51 and 52. (See FIGS. 5 and 6). The rollers 3 are preferably opposite wheels 1 and 2 respectively and are so mounted that the rolling tracks 51 and 52 are, respectively, located between the sprocket wheels 1 and their associated locating rollers 3, on the one hand, and between the smooth wheels 2 and their associated locating rollers 3, on the other hand. It will be noted that the sprocket wheels 1 and the smooth wheels 2 provide a supporting or bearing function for the drum 56, that the sprocket wheels 1 also provide a lateral maintaining or guiding function for the drum 56, the links 61 of the chain 60 engaging with the teeth of the sprocket wheels 1, thus preventing displacement of the drum in the axial direction relatively to the chassis 8, and that the rollers 3 prevent the drum 56 from lifting off the supporting wheels 1 and 2.

Figure 3:
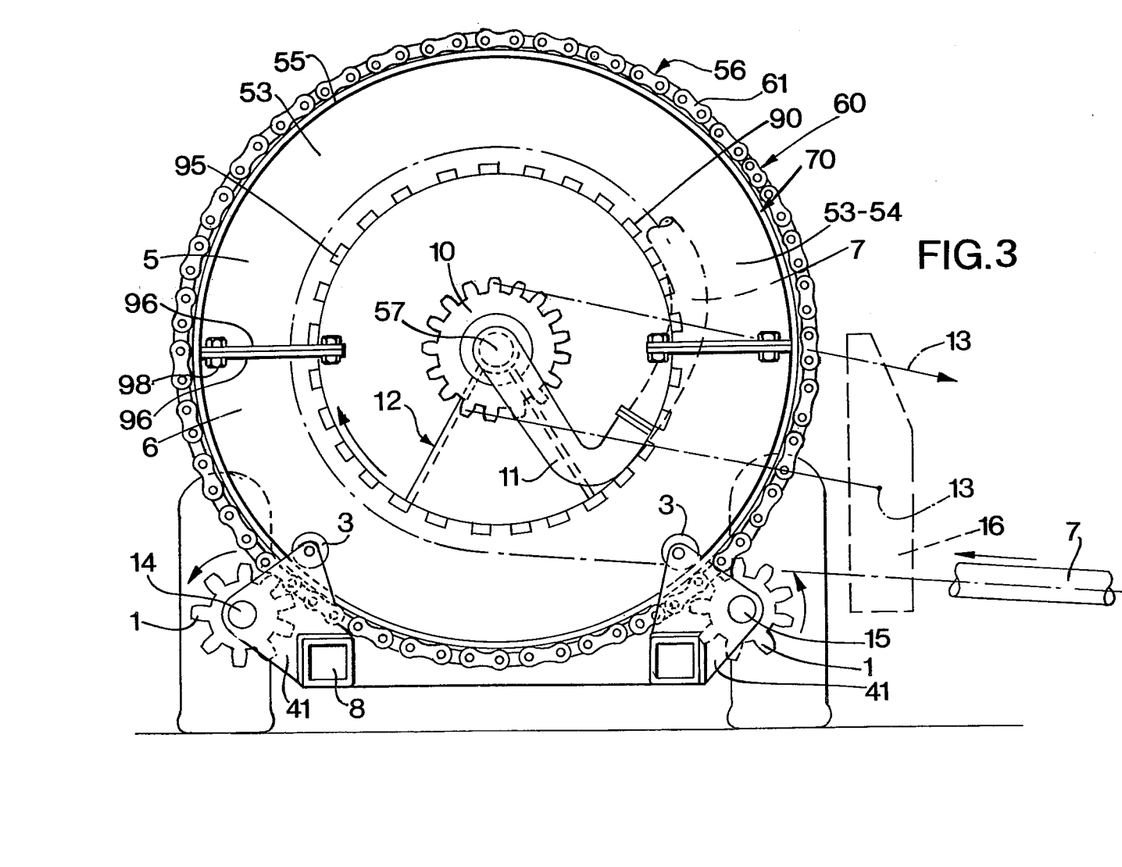
FIG. 3 is a rear view of the first embodiment of the machine including the drum in position on the chassis.
Figure 4:
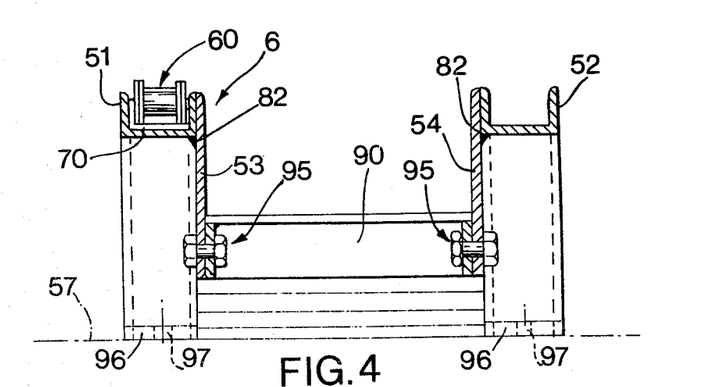
FIG. 4 is an axial section of a dismountable semi-cylindrical portion of the drum.
Figure 5:
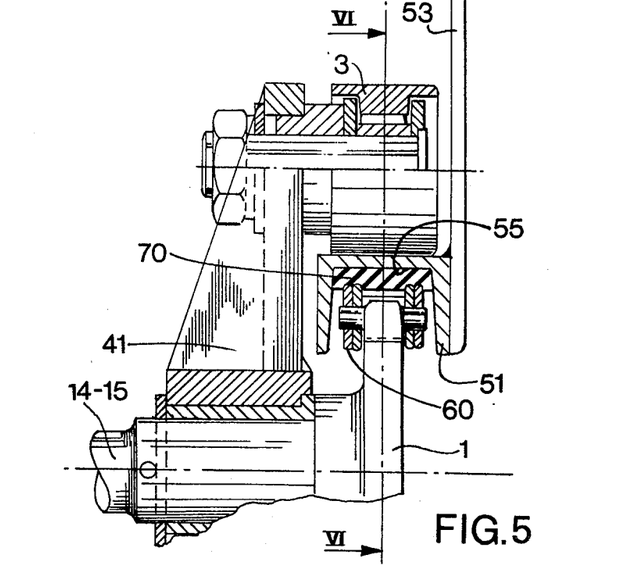
FIG. 5 is a partial section to a larger scale of the driving means for the drum, showing a toothed sprocket wheel, the chain, the rolling track of the drum and a locating roller in the embodiment shown in FIGS. 1-3.
Figure 6:
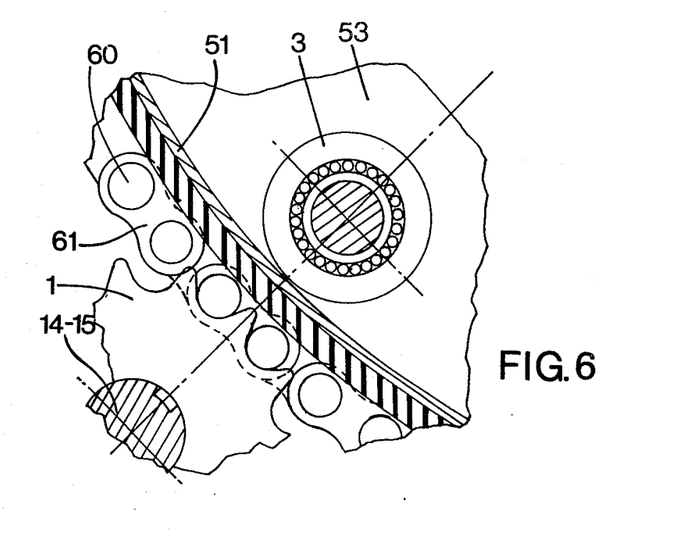
FIG. 6 is a sectional view along the line VI-VI in FIG. 5.

In addition, the sprocket wheels 1 have a third function and this is a driving function. Thus, rotation of the sprocket wheels 1, by conventional means, not illustrated, such as a water turbine or a hydraulic piston motor, mounted, for example, in the water supply circuit to the hose 7 of the machine, produces through the intermediary of the teeth of the sprocket wheels and the chain 61, rotation of the drum 56 on the sprocket wheels 1 and the smooth wheels 2. In reality, only one of the sprocket wheels 1, for example that at the left-hand side in FIG. 3, is connected through its shaft 14 to driving means, the sprocket wheel 1 shown at the right-hand side in FIG. 3 being provided for the rapid rotation of the spool through the intermediary of its shaft 15. The latter may, for example, be driven by the power take-off shaft of the tractor, not illustrated, which is used to tow the machine by the draw-bar 84. In such a case, the toothed wheel 1 on shaft 15 is allowed to idle on its shaft during normal driving of the drum 56 by the sprocket wheel 1 on shaft 14 and, during the rapid driving of the drum 5, the sprocket wheel 1 on shaft 14 is uncoupled from its driving means.

In the embodiment illustrated in FIGS. 1–6 a band 70 of rubber or other elastomeric material is interposed between the rolling track 51 and the chain 60, said band 70 lying on the base 55 of the rolling track 51. This band in which the chain 60 is embedded improves the adhesion of the chain 60 to the rolling track 51. In addition, by virtue of its elasticity, it makes it possible to compensate for lack of precision in the initial length of the chain by prestressing or compressing the rubber or elastomeric material according to the tension exerted on the chain when two links at the ends of the chain 60 are connected to engage the chain around the rolling track 51 and afterwards to take up by the expansion of the rubber or elastomeric material which was originally prestressed any increase in length of said chain which occurs during use of the machine.

As thus described, the machine of the first embodiment is intended, in a manner known in itself, to accept one extremity of a supple watering hose 7, illustrated in part in FIG. 3, said extremity being attached to a pipe 11 for the supply of water attached by means of a supporting plate 12 to the half-portion 6 of the drum 56.

There is provided, integral with said half-portion 6 and coaxial with it, a control sprocket 10 (see FIG. 3) intended to control, through the intermediary of a chain 13, a lead screw of a distribution device 16, known in itself, and shown schematically in FIG. 3, which makes it possible during each rotation of the drum to guide the hose 7 and to move it in the axial direction of the drum so that rolling-up of the hose takes place smoothly.

The other end of the hose 7 is connected to a watering nozzle or gun, not illustrated, mounted on a trolley or sledge, moved during watering by the tension of the hose, as the latter is rolled-up on to the drum 56.

As has already been seen above, the drum 56 comprises two half-portions 5 and 6, one of which i.e. the half-portion 6 (see FIG. 4), can be dismounted.

The half-portion 6 comprises two annular side plates 53, 54 on to which there are fixed the corresponding halves of the driving rolling track 51 and the rolling track 52 which is solely a supporting track.

These rolling tracks are advantageously welded at 82 (FIG. 4) to the side plates 53, 54 along the length of their external periphery. The two plates 53, 54 are joined together by a series of cross-pieces 90, arranged parallel to the axis 57 of the half-portions 5, 6, by means of screws or bolts 95 or are permanently connected together. The half-portion 5 is constructed in a similar way. Dismounting of the half-portion 6 makes it possible to reduce the weight and height of the machine for transport, only the non-dismountable half-portion 5 remaining mounted on the chassis. Alternatively, the lower half-portion 5 of the drum may be removed from the chassis.

Each of the two above-mentioned half-portions 5 and 6 includes in its axial plane two plates 96 pierced by holes and arranged to be connected together to form the complete drum by means of screws or bolts 98 (see FIG. 3).

In addition to the advantages described above, the embodiment of the machine described with reference to FIGS. 1–6, owing to the fact that its drum 56 rotates very close to the chassis 8 and even down to a level below the upper plane of said chassis between the two longitudinal members of said chassis, as can be seen in FIG. 3, allows the watering hose 7 while it is being rolled-up on to the drum, to be lifted through a very small height above the ground. This has the result of further improving the stability of the machine according to the invention.

Figure 7:
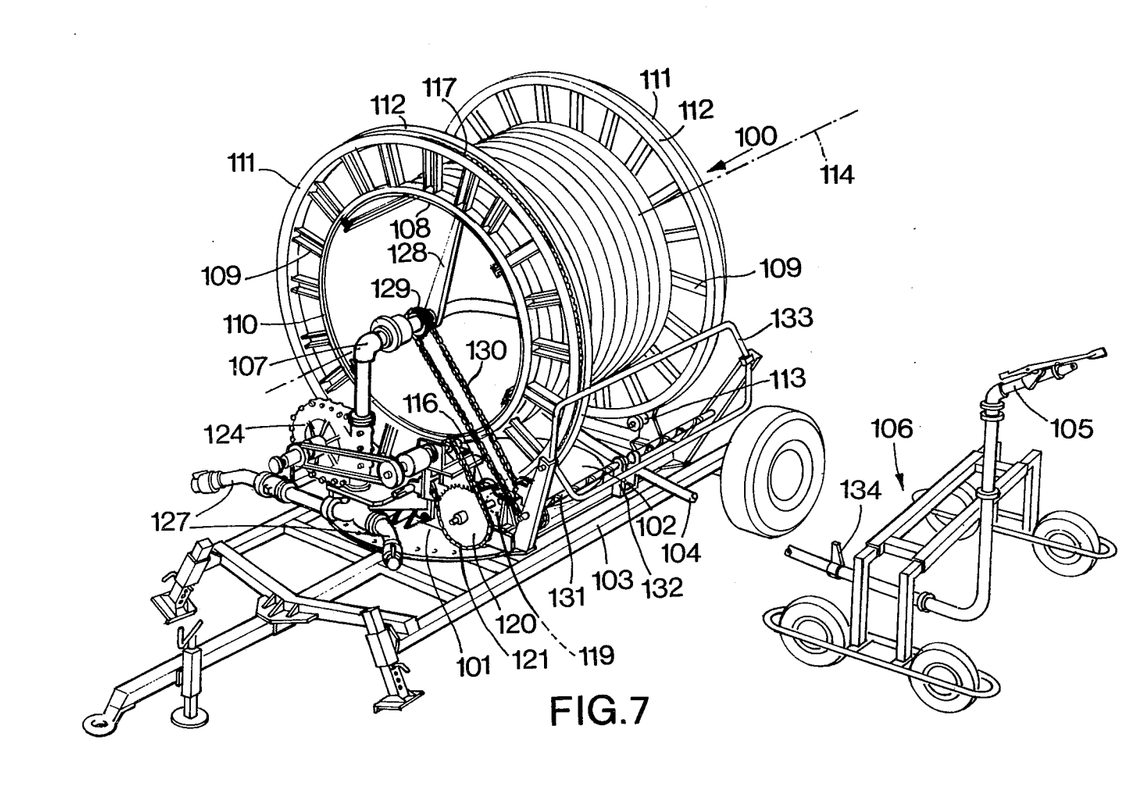
FIG. 7 is a diagrammatic perspective view of the second embodiment.
Figure 8:
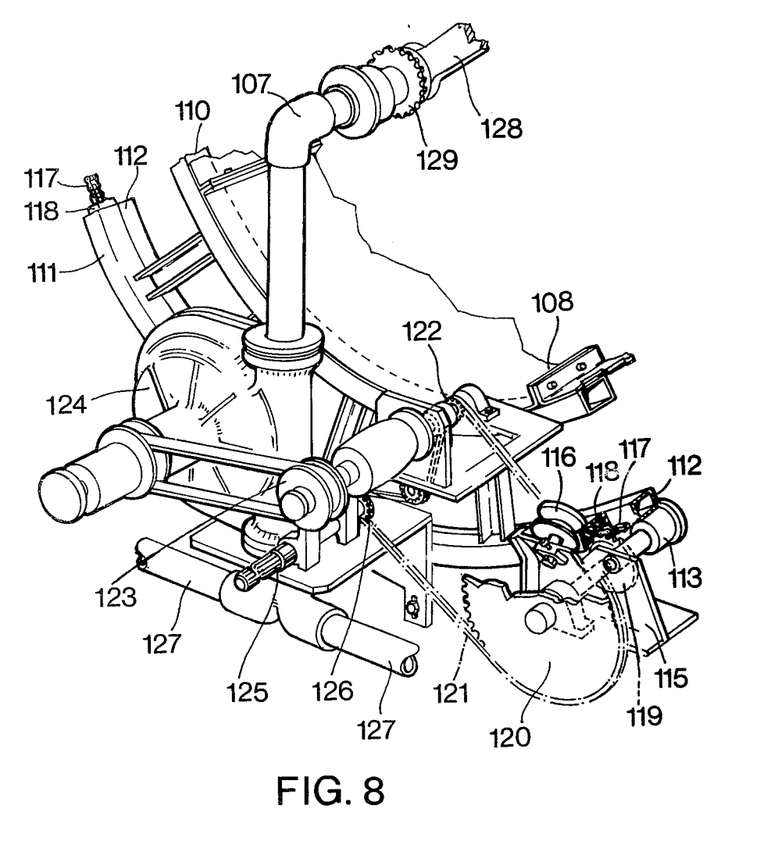
FIG. 8 is a perspective view to a larger scale of part of FIG. 7 showing the driving means for the drum.
Figure 9:
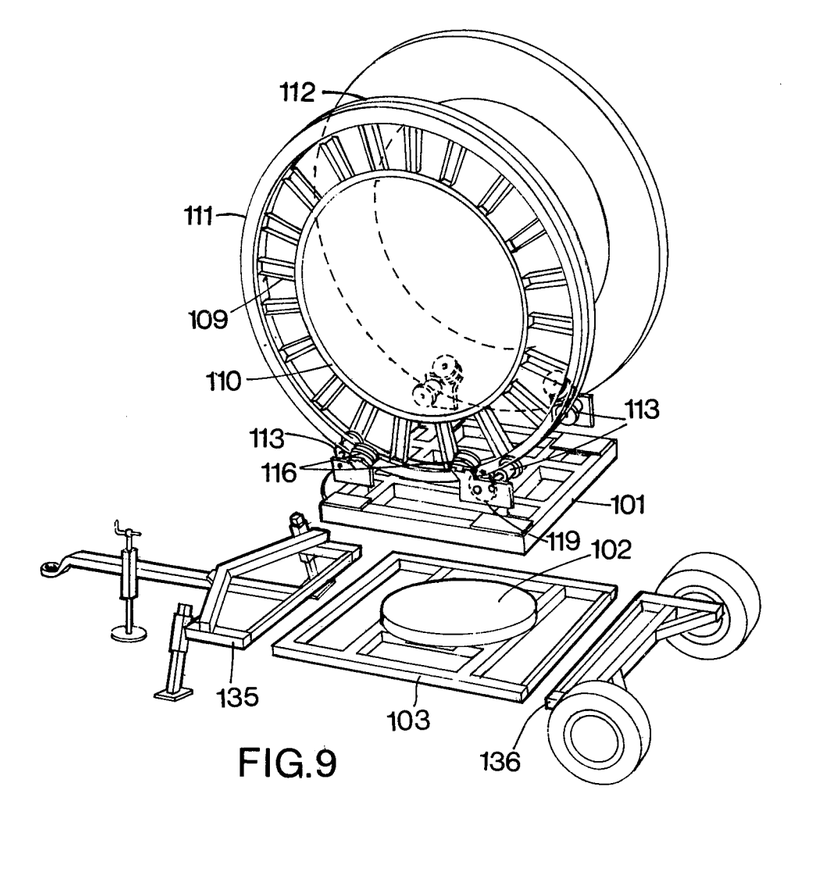
FIG. 9 is a diagrammatic and exploded perspective view showing the chassis, the turret and the drum of the second embodiment.

The second embodiment of the irrigation machine, shown in FIGS. 7–9, is similar in principle to the first embodiment shown in FIGS. 1–6 with the important difference that the hose-drum 100 is mounted on a turret 101 which is mounted on a turntable 102, containing supporting rollers or balls (not shown). The turntable 102 is mounted on the chassis 103 and thus the hose-drum 100 together with the turret 101 can be turned through substantially 180°, or through 360°, to permit the hose 104 to extend in any desired direction. As before, the outer end of the hose 104 is connected to an irrigation nozzle or gun 105 mounted on a wheeled trolley 106 or sledge. The inner end of the hose 104 is connected through a rotatable joint with a stationary supply pipe 107.

The hose-drum 100, as in the first embodiment, does not have a central supporting shaft. It comprises an inner cylindrical hollow drum 108 which may be a single cylinder to be constructed from two or a greater number of arcuate part-cylindrical portions (e.g. four) bolted together by abutting radial flanges to form the cylinder. In this way the drum can be dismantled for facilitating transport. The hose-drum 100 has radially-outwardly extending end flanges which are secured to the hollow drum 108 and each comprise a radially inner ring 110 connected to outer circular rims by radial spokes 109. The outer circular rims each comprise a hollow box section circular member 112 and a hollow radially-outwardly facing circular channel 111 welded, or otherwise secured, side-by-side. The spokes 109 of the two end flanges serve to retain the convolutions of the hose on the drum. The hollow box-like members 112 each rest on four cylindrical rollers 113 mounted in two pairs spaced apart in the axial direction of the hose-drum and also peripherally of each member 112 to form a cradle in which the hose-drum is supported for turning about its axis 114. The four rollers 113 are freely mounted on brackets or plinths 115 (FIG. 8) mounted on the turret 101. Each bracket 115 also carries a freely-rotatable flanged wheel 116 which is inclined with respect to the axial direction of the hose-drum and locates the outside of the respective channel 111 by bearing against both its outer side wall and its radially inner wall. Thus the hose-drum is restrained from axial movement on the rollers 113 and is also maintained in rolling engagement with the rollers 113. The wheels 116 are therefore equivalent to the rollers 3 in the first embodiment and additionally restrain the hose-drum from axial movement. Adjustment of the axle of the wheels 116 relatively to the respective bracket may be provided.

One of the channels 111, see particularly FIG. 8, contains an endless chain 117 fixed with respect to the channel and embedded therein in a bed 118 of rubber or other elastomeric material, as in the first embodiment. The chain 117 engages a sprocket wheel 119 which is mounted on one only of the brackets or plinths 115, as shown in FIG. 8. The sprocket wheel 119 is arranged to be driven and thus this turns the hose-drum about its axis 114. The sprocket wheel 119 is driven by a larger co-axial sprocket wheel 120 (see FIG. 8) driven by an endless chain 121 from a driven sprocket wheel 122 mounted on a pulley system 123 driven by a water turbine 124 which is in turn driven by water supplied from a pump, not shown, to the pipe 107. Thus water supplied through the hose 104 to the irrigation nozzle or gun 105 also drives the turbine 124 and hence the hose-drum 100, thereby to effect winding-in of the hose 104 while irrigation is being performed. The turbine 124 may be replaced by an axial flow turbine provided by a valve-controlled by-pass. The turbine in the latter arrangement is therefore controllable by adjustment of the valve in the by-pass to vary the speed of rotation of the hose-drum and hence of the irrigation trolley or sledge 106.

An auxiliary drive shaft 125 for driving another sprocket wheel 126 for driving the chain 121 is provided. The drive shaft 125 has a splined end for engagement with the power take-off shaft of a tractor to enable the hose to be re-wound fast or when there is a failure in the water supply to the turbine 124. Water inlet and drain pipes 127 connected to the turbine inlet are also indicated in FIGS. 7 and 8.

The stationary water inlet pipe 107, supports an arm 128 (see FIG. 7) which is connected at its radially outer end and to a flange on the drum 108 and carries at its radially inner end and co-axially with the pipe 107 a sprocket wheel 129. This turns an endless chain 130 which drives a lead-screw 131 carrying a combined nut and shackle 132 through which the hose 104 passes. Thus as the hose-drum is rotated to wind-in the hose 104, the convolutions will be laid side-by-side on the drum due to the movement of the shackle 132, driven by the lead-screw 131. A lead-screw and hose-guiding shackle are known per se in conventional hose-drum machines.

FIG. 7 also indicates a safety bar 133 which is mounted on the turret 101 and is arranged to bear against the rims 111, 112 of the hose-drum and be pivoted outwardly of the hose-drum by the convolutions of the hose in the event that the convolutions are wound thereon loosely or in more than the permitted number of layers of turns and thereby to stop the drive to the hose-drum by effecting declutching of the drive to the driving sprocket wheel 119 or by shutting off the water supply to the turbine or by dumping water supplied by a pump supplying the turbine, the pump (not shown) being of the type which will shut down when the delivery pressure therefrom falls due to the dumping of water. Such an arrangement of safety bar is known in conventional hose-drum machines and is therefore not fully illustrated or described herein.

The safety bar 133 is also arranged to stop the driving of the drum and the discharge of water, when the trolley or sledge has been pulled close to the chassis. This is performed in known manner by an upstanding stop 134 clamped to the hose 104 hitting a lower part of the safety bar 133 to stop the flow of water to the hose or to dump water flowing from the pump, as already explained, or to declutch the turbine.

Another feature of this embodiment, and which may also be used in an irrigation machine also according to the invention wherein the hose-drum is mounted directly on the chassis, is to construct the center portion of the chassis on which the turntable 102 is mounted or on which the hose-drum supporting wheels or rollers are directly mounted as a basic frame which can rest directly on the ground. Detachable end frame portions may be attached to the center portion to provide ground-engaging wheels, a draw-bar, powered ground-engaging wheels, and/or supporting legs. Any such end frame portions may be interchanged or removed depending upon the use required. This flexability of applications is shown in FIG. 9, in which the central chassis portion is indicated at 103 as in FIG. 7; but the detachable end portions just referred to are indicated by references 135 and 136.

Figure 10:
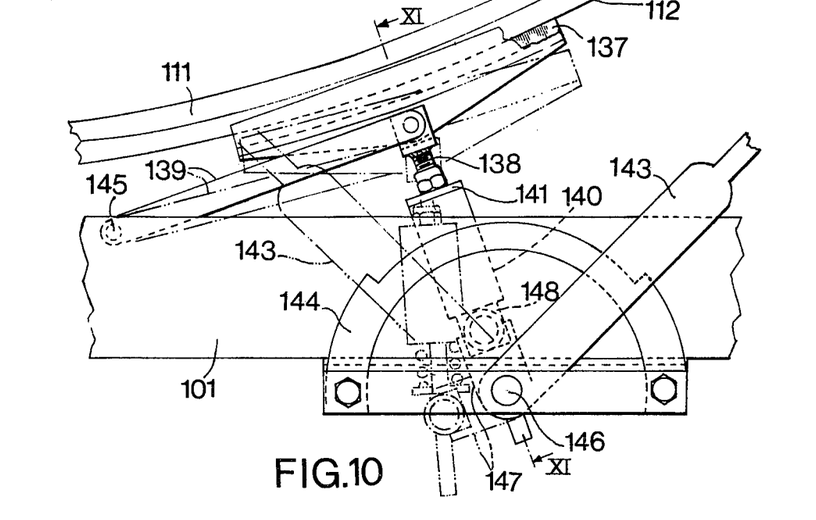
FIG. 10 is a side view of a peripheral part of the drum of either embodiment showing a braking mechanism for the drum.
Figure 11:
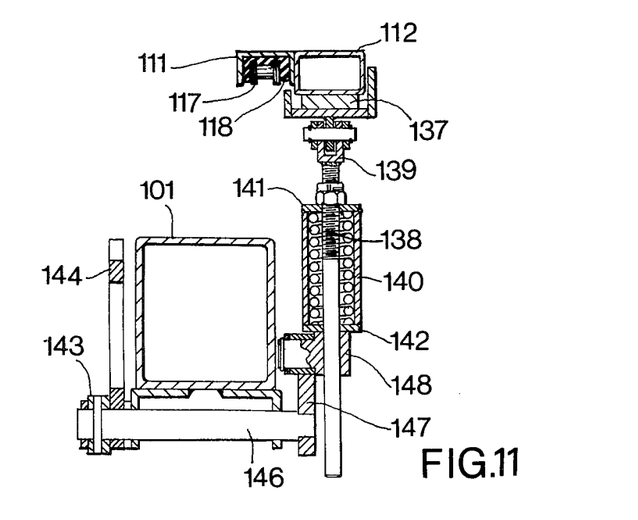
FIG. 11 is a section on the line XI-XI in FIG. 10.

When the hose-drum in either of the aforegoing embodiments is not being driven and especially where the chassis 103 is being transported to a different location, it is advisable to be able to apply a brake to prevent free rotation of the hose-drum. A suitable brake is shown in FIGS. 10 and 11. The brake comprises a brake pad 137 mounted on the outer end of a plunger 138 and of a link 139 pivoted at 145 to the turret 101 or the chassis 103, as applicable. The plunger 138 is urged into a 'BRAKE ON' position, as illustrated in FIG. 10 in full lines and in FIG. 11, by a compression spring 140 acting between a pre-adjustable collar 141 on the plunger 138 and a stop 142 which is fixed in the illustrated position by a block 148. The block 148 is engaged by a stop 147 carried on a lever 143 set to the indicated position in a fixed guide quadrant 144 in which it is pivoted by shaft 146. The guide quadrant 144 and lever 143 are mounted on the turret 101 or chassis 103, as applicable. The brake pad 137 is positioned to engage against the radially-outer surface of the rim member 112 of the hose-drum 100. When the lever 143 is in the 'BRAKE OFF' position, indicated in FIG. 10 in broken lines, the stop 146 is moved to the position indicated by broken lines, thereby allowing the block 148 to slide down the plunger 138, whereby the compression of the spring 140 is released and the brake end 137 drops away by pivoting of the link 139 about its pivot 145.

In the embodiments of irrigation machine illustrated and described herein, the important feature of mounting the hose-drum lower than in conventional hose-drum machines is present. This is because in each embodiment, the hose-drum is mounted for rotation on a cradle of rotatable wheels or rollers instead of supporting the hose-drum on a central axis supported at its ends in brackets or stanchions, as previously known. This means, as pointed out hereinbefore, that the center of gravity of the part of the machine on which the hose-drum is mounted is low and so the risk of the machine toppling over is reduced or eliminated. Furthermore the hose does not have to be lifted too far from the ground as it is being re-wound onto the hose-drum. Therefore, the risk of overturning the machine by the drag of the hose on the drum is reduced or eliminated. Also in both embodiments, the hose-drum can be dismantled to facilitate transport of the machine.

What I claim as my invention and desire to secure by Letters Patent of the United States is:

1. A hose-drum irrigation machine of the kind including a chassis, a hose-drum carried by the chassis for rotation about an axis extending longitudinally through said drum, a hose wound on the hose-drum and to be connected at the end adjacent said hose-drum to water-supply means, an irrigation water-discharge device connected to the end of the hose remote from said hose-drum, and means to turn said drum about said longitudinal axis in the hose-rewinding sense and thereby to pull said irrigation water-discharge device toward said hose-drum, the irrigation machine also including two sets of drum-supporting wheels supported for rotation by said chassis to provide a cradle on which said drum is mounted and is rotatable about said longitudinal axis without the provision of a central supporting shaft co-axial with the drum, said drum having a pair of laterally-spaced peripheral rolling tracks arranged to engage said supporting wheels, two sets of drum-locating wheels mounted for rotation about axes spaced from the axes of rotation of said drum-supporting wheels to engage radially inner surfaces of said peripheral rolling tracks to maintain said drum to engagement with said drum-supporting wheels and to restrain said drum from end-wise movement on said drum-supporting wheels, at least one of said drum-supporting wheels arranged to be driven by said driving means to effect rotation of said drum in the hose-rewinding sense.

2. An irrigation machine as claimed in claim 1 in which said driven drum-supporting wheel is a toothed sprocket wheel and said drum carries an endless chain co-axial with one of said peripheral rolling tracks on the drum and fixed with respect to the drum and wherein said sprocket wheel engages said chain.

3. An irrigation machine as claimed in claim 2 in which said driving means driving said sprocket wheel is a turbine arranged to be driven by water supplied to said hose.

4. An irrigation machine as claimed in claim 2 in which said driving means driving said sprocket wheel is a hydraulic motor arranged to be driven by water supplied to said hose.

5. An irrigation machine as claimed in claim 2 in which a drum-supporting wheel is provided adjacent said sprocket wheel and is arranged to engage and to support said drum around a peripheral rolling track adjacent said enveloping chain which is engaged by said sprocket wheel.

6. An irrigation machine as claimed in claim 5 in which there is a common mounting on which said sprocket wheel and said adjacent drum-supporting wheel are mounted.

7. An irrigation machine as claimed in claim 6 in which said common mounting also includes a separate drum-locating wheel engaging a radially inner surface of said peripheral rolling track to maintain said drum in engagement with said drum-supporting wheel.

8. An irrigation machine as claimed in claim 6 in which said wheel engaging said radially inner surface of said peripheral rolling track is rotatable about an axis inclined to the axis of rotation of said drum-supporting wheel and also engages a side surface of said peripheral rolling track, thereby to restrict movement of said drum on said drum-supporting wheels in directions axially of said drum.

9. An irrigation machine as claimed in claim 6 in which said drum is supported on two sets of drum-supporting wheels, each associated with a respective drum-locating wheel, the two sets of wheels spaced apart axially of said drum and engaging a respective peripheral rolling track and each set having two drum-supporting wheels and associated drum-locating wheels spaced apart peripherally with respect to said respective peripheral rolling track, whereby said drum is supported and located at four positions, one at least of said drum-supporting wheels having adjacent thereto said driven sprocket wheel.

10. An irrigation machine as claimed in claim 7 in which said peripheral rolling track engaged by said sprocket wheel has radially inner and outer smooth peripheral rolling surfaces engaged respectively by said drum-locating and said drum-supporting wheels, and axially-adjacent said smooth peripheral rolling surfaces a peripherally-extending channel open in the radially-outwardly-facing direction of said drum, a ring of elastomeric material in said channel and said driving chain embedded in said elastomeric material in said channel.

11. An irrigation machine as claimed in claim 2 including a turret on which said wheels supporting and locating said hose-drum and said driving sprocket are mounted, a turntable carried by said chassis, said turret mounted on said turntable whereby said turret and said hose-drum are rotatable about an upright axis.

12. An irrigation machine as claimed in claim 11 in which said turret carries a brake device engageable with one said peripheral rolling track, whereby free rotation of said hose-drum is restrained when said brake device is applied.

13. An irrigation machine as claimed in claim 2 in which said sprocket wheel arranged to drive said chain on said hose-drum is normally operable by the supply of water to said hose and is also arranged to be driven to turn said hose-drum in the hose-rewinding sense by an external power source alternatively to turning said drum in the hose-rewinding sense by the supply of water to the hose.

14. An irrigation machine as claimed in claim 2 in which said sprocket wheel engaging said chain on said hose-drum is arranged to be driven in the hose-rewinding sense by the supply of water to the hose and said irrigation machine includes an additional sprocket wheel engaging said chain and arranged to be driven to turn said hose-drum in the hose-rewinding sence by an external power source alternatively to turning said drum in the hose-rewinding sense by the supply of water to the hose.

15. An irrigation machine as claimed in claim 1 in which said hose-drum is constructed in a plurality of arcuate portions to be assembled circumferentially to form a complete cylinder and dismountable one from another.

16. An irrigation machine as claimed in claim 15 in which said hose-drum has annular end flanges separable from said cylinder constructed from said plurality of arcuate portions assembled circumferentially.

17. An irrigation machine as claimed in claim 1 in which said chassis comprises a main portion on which said hose-drum is mounted and at least one removable separate frame portion.

18. An irrigation machine as claimed in claim 17 in which one said removable frame portion constitutes a draw-bar by which said chassis is towed.

19. An irrigation machine as claimed in claim 17 in which one said removable frame portion carries ground-engaging wheels.

20. An irrigation machine as claimed in claim 17 in which one said removable frame portion carries ground-engageable legs.

21. An irrigation machine as claimed in claim 1 in which said chassis carries a brake device engageable with one said peripheral rolling track, whereby free rotation of said hose-drum is restrained when said brake device is applied.

22. An irrigation machine as claimed in claim 1 in which a rotatable pipe connector is provided at the inlet end of said hose between said hose and a stationary supply pipe, whereby water is admitted to said hose while said hose-drum is rotating on said drum-supporting wheels.

23. An irrigation machine as claimed in claim 1 including a rotatable lead-screw mounted parallel with the axis of rotation of said hose-drum; a combined hose-guide and not engaging said lead-screw, an annular portion of said hose adjacent said hose-drum and leading to said irrigation water-discharge device passing through said hose-guide and means for rotating said lead-screw in synchronism with said hose-drum, thereby to lay convolutions of said hose side-by-side on said hose-drum, as the latter is turned in the hose-rewinding sense.

24. An irrigation machine as claimed in claim 23 in which a rotatable pipe connector is provided at the inlet end of said hose between said hose and a stationary supply pipe, whereby water is admitted to said hose while said hose-drum is rotating on said drum-supporting wheels, and in which said stationary supply pipe carries a driving wheel fixed to said hose-drum for rotation therewith, a driven wheel mounted to rotate said lead-screw and connecting means between said driving and driven wheels.

25. A hose-drum irrigation machine including a chassis, a hose-drum carried by the chassis for rotation about an axis extending longitudinally through said hose-drum to wind and unwind a hose thereon, means to turn said hose-drum about said longitudinal axis in the hose-winding sense; two sets of drum-supporting wheels supported for rotation by said chassis to provide a cradle on which said hose-drum is mounted and is rotatable about said longitudinal axis without the provision of a central supporting shaft co-axial with the hose-drum, said hose-drum having a pair of laterally-spaced peripheral rolling tracks arranged to engage said supporting wheels; two sets of drum-locating wheels mounted for rotation about axes spaced from the axes of rotation of said drum-supporting wheels to engage radially inner surfaces of said peripheral rolling tracks to maintain said hose-drum in engagement with said drum-supporting wheels, means to restrain said hose-drum from end-wise movement on said drum-supporting wheels, at least one of said drum-supporting wheels including means to be driven by said driving means to effect rotation of said hose-drum in the hose-winding sense.

* * * * *

UNITED STATES PATENT OFFICE
CERTIFICATE OF CORRECTION

Patent No. 4,306,682     Dated December 22, 1981

Inventor(s) Jean Yvon Toussaint

It is certified that error appears in the above-identified patent and that said Letters Patent are hereby corrected as shown below:

Column 1, line 24, delete "end", insert --ends--.

Column 3, line 45, delete "by way of example,"

Column 5, line 19, delete "spool", insert --drum--.

Column 5, line 26, delete "5", insert --56--.

Column 7, line 55, delete "per se", insert --*per se*--.

Column 8, line 55, delete "end", insert --pad--.

Column 8, line 63, delete "axis", insert --axle--.

Signed and Sealed this

Sixteenth Day of March 1982

|SEAL|

*Attest:*

*Attesting Officer*

GERALD J. MOSSINGHOFF
*Commissioner of Patents and Trademarks*